US008818806B2

(12) United States Patent
Yamabe

(10) Patent No.: US 8,818,806 B2

(45) Date of Patent: Aug. 26, 2014

(54) SPEECH PROCESSING APPARATUS AND SPEECH PROCESSING METHOD

(75) Inventor: Takaaki Yamabe, Yokohama (JP)

(73) Assignee: JVC KENWOOD Corporation, Kanagawa-Ku, Yokohama-Shi, Kanagawa-Ken (JP)

( * ) Notice: Subject to any disclaimer, the term of this patent is extended or adjusted under 35 U.S.C. 154(b) by 310 days.

(21) Appl. No.: 13/305,322

(22) Filed: Nov. 28, 2011

(65) Prior Publication Data

US 2012/0136655 A1 May 31, 2012

(30) Foreign Application Priority Data

Nov. 30, 2010 (JP) ................................ 2010-267250

(51) Int. Cl.
*G10L 15/00* (2013.01)

(52) U.S. Cl.
USPC ............................ 704/233; 704/207; 704/226

(58) Field of Classification Search
USPC ......................................... 704/226–228, 233
See application file for complete search history.

(56) References Cited

U.S. PATENT DOCUMENTS

| | | | | |
|---|---|---|---|---|
| 8,463,607 | B2 * | 6/2013 | Tanaka et al. | 704/233 |
| 2002/0053979 | A1 * | 5/2002 | Mynatt et al. | 340/573.4 |
| 2007/0174052 | A1 * | 7/2007 | Manjunath et al. | 704/219 |
| 2007/0255535 | A1 * | 11/2007 | Marro et al. | 702/194 |
| 2008/0069364 | A1 * | 3/2008 | Itou et al. | 381/17 |
| 2008/0167870 | A1 * | 7/2008 | Hetherington et al. | 704/233 |

FOREIGN PATENT DOCUMENTS

| | | |
|---|---|---|
| JP | 2009-069425 | 4/2009 |
| JP | 2009-294537 | 12/2009 |

OTHER PUBLICATIONS

Degottex, Gilles. "Spectral filtering for musical signal separation." (2006). http://svn.gna.org/svn/fanr/website/misc/gilles_degottex_sfmss_060213.pdf.*

Xie, X., & Kuang, J. M. (Oct. 1999). A noise canceller for mobile communications utilizing time-frequency analysis. In Communications, 1999. APCC/OECC'99. Fifth Asia-Pacific Conference on . . . and Fourth Optoelectronics and Communications Conference (vol. 1, pp. 504-507). IEEE.*

Every, M., & Szymanski, J. (Oct. 2004). A spectral-filtering approach to music signal separation. In Proc. DAFx (pp. 197-200).*

* cited by examiner

*Primary Examiner* — Douglas Godbold
*Assistant Examiner* — Ernest Estes
(74) *Attorney, Agent, or Firm* — Renner, Kenner, Greive, Bobak, Taylor & Weber

(57) ABSTRACT

A signal portion is extracted per frame having a specific duration from an input signal, thus generating a per-frame input signal. The per-frame input signal in the time domain is converted into a per-frame input signal in the frequency domain, thereby generating a spectral pattern of spectra. Peak spectra having peaks are detected in the spectral pattern. A harmonic spectrum is determined, in the peak spectra, having a harmonic structure showing a relationship between a fundamental pitch and a harmonic overtone.

8 Claims, 5 Drawing Sheets

SPEECH PROCESSING APPARATUS AND SPEECH PROCESSING METHOD

CROSS-REFERENCE TO RELATED APPLICATIONS

This application is based on and claims the benefit of priority from the prior Japanese Patent Application No. 2010-267250 filed on Nov. 30, 2010, the entire content of which is incorporated herein by reference.

BACKGROUND OF THE INVENTION

The present invention relates to a speech processing apparatus and a speech processing method for distinguishing between noise components and speech components.

A signal generated by capturing voices carries speech segments that involve the voices and non-speech segments that are pauses or breath with no voices. A speech (or voice) recognition system determines speech and non-speech segments for higher speech recognition rate and speech-recognition process efficiency. Mobile communication using mobile phones, transceivers, etc. switches the encoding process for input signals between speech and non-speech segments for higher coded rate and transfer efficiency. The mobile communication requires a real-time performance, hence demanding less delay in a speech-segment determination process.

A known speech-segment determination process with less delay detects speech segments, with cepstrum analysis to: derive harmonic data on a fundamental wave that involves the maximum number of harmonic overtone components, from a frame of an input signal; and analyze the harmonic data and power data on energy in the frame (the power data indicating an energy level with respect to a threshold level) whether the harmonic and power data exhibit the feature of voices. Another known speech-segment determination process with less delay derives autocorrelation of spectra spread in the frequency domain and detects speech segments based on the level of autocorrelation.

The known speech-segment determination processes are effective in an environment where noises are relatively small. However, the known processes tend to erroneously detect speech segments when noises become larger due to the fact the feature of voices is embedded in the noises. The feature of voices is, for example, the flatness of a frequency distribution (indicating how often peaks appear) of a frame of an input signal and the pitch (high tones).

Moreover, the cepstrum analysis requires to perform Fourier transform two times with a heavy processing load in the frequency domain, thus consuming much power. Thus, if the cepstrum analysis is employed in a battery-powered system such as mobile communication equipment, a higher-capacity battery is required for much power consumption, resulting in a higher cost, a bulkier system, etc.

Furthermore, for an input signal that carries periodic noises like voices having periodicity, a known technique for detecting the feature of voices based on the periodicity of voices may erroneously determine noises as voices.

SUMMARY OF THE INVENTION

A purpose of the present invention is to provide a speech processing apparatus and a speech processing method for distinguishing between noise components and speech components even if noises are periodical like voices having periodicity.

The present invention provides a speech processing apparatus comprising: a frame extraction unit configured to extract a signal portion per frame having a specific duration from an input signal, thus generating a per-frame input signal; a spectrum generation unit configured to convert the per-frame input signal in a time domain into a per-frame input signal in a frequency domain, thereby generating a spectral pattern of spectra; a peak detection unit configured to detect peak spectra having peaks in the spectral pattern; and a harmonic-overtone determination unit configured to determine a harmonic spectrum, in the peak spectra, having a harmonic structure showing a relationship between a fundamental pitch and a harmonic overtone.

Moreover, the present invention provides a speech processing method comprising the steps of: extracting a signal portion per frame having a specific duration from an input signal, thus generating a per-frame input signal; converting the per-frame input signal in a time domain into a per-frame input signal in a frequency domain, thereby generating a spectral pattern of spectra; detecting peak spectra having peaks in the spectral pattern; and determining a harmonic spectrum, in the peak spectra, having a harmonic structure showing a relationship between a fundamental pitch and a harmonic overtone.

DETAILED DESCRIPTION OF PREFERRED EMBODIMENTS

Before describing embodiments according the present invention, the problems on the known speech-segment determination processes are discussed further in detail with respect to the attached drawings.

The known speech-segment determination processes have a problem of difficulty in the detection of acoustic characteristics of voices when the surrounding noises become larger in the environment where the voices are captured, thus tend to erroneously detect speech segments. Especially, the known speech-segment determination processes tend to erroneously detect speech segments in the conversation using mobile communication equipment, such as a mobile phone, a transceiver, etc. in an environment, such as an intersection with heavy traffic, a site under construction, and a factory in operation.

In the erroneous detection of speech segments: a speech segment may be erroneously determined as a non-speech segment to cause too much compression of an input signal in the speech segment; or a non-speech segment may be erroneously determined as a speech segment to cause inefficient coding, leading to trouble in conversation due to lowered sound quality.

Moreover, the known speech-segment determination processes have problems when employed in mobile communication equipment having a noise canceling function, with no encoding circuitry installed. In detail, when the speech segment determination is performed erroneously, noises cannot be canceled normally and hence it is very difficult for a communication partner to listen to the reproduced voices.

Particularly, for an input signal that carries periodic noises like voices having periodicity, a known technique for detecting the feature of voices based on the periodicity of voices may erroneously determine noises as voices. For example, a frame including both of voices and noises exhibits a lower autocorrelation for a speech signal than a frame of voices only. Thus, the frame including both of voices and noises may be determined as a non-speech segment, although which should be determined as a speech segment. Furthermore, a frame of periodic noises only may be erroneously determined as a speech segment due to the periodicity of noises.

Figure 1:
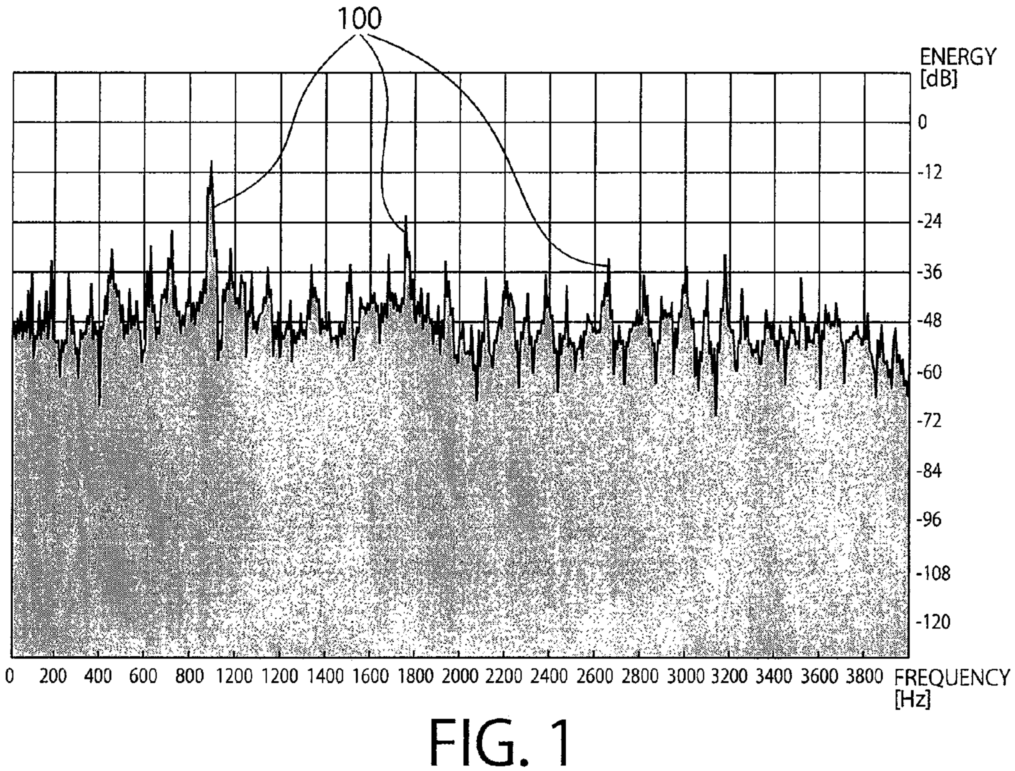
FIG. 1 is a view showing the frequency characteristics of a periodic noise signal.

FIG. 1 is a view showing the frequency characteristics of a periodic noise signal, for noises made by a running racing car. There is a possibility that a noise signal such as shown in FIG. 1 is erroneously determined as a voice, even though it is not a speech signal, due to the existence of periodic peak spectra 100.

Figure 2:
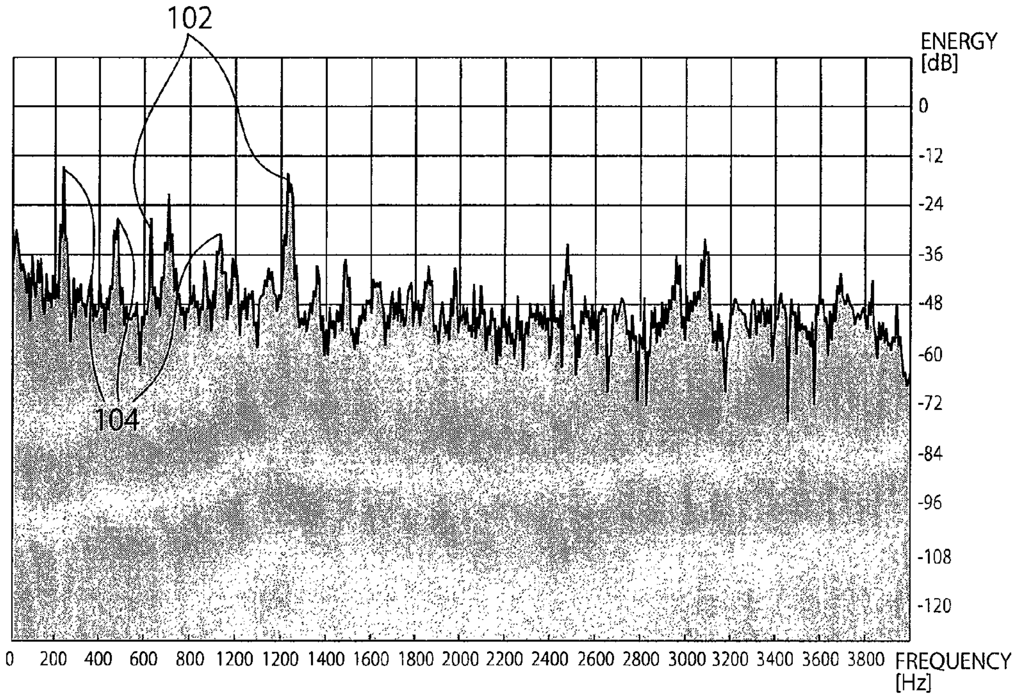
FIG. 2 is a view showing the frequency characteristics of an input signal involving periodic noise and speech signals.
Figure 3:
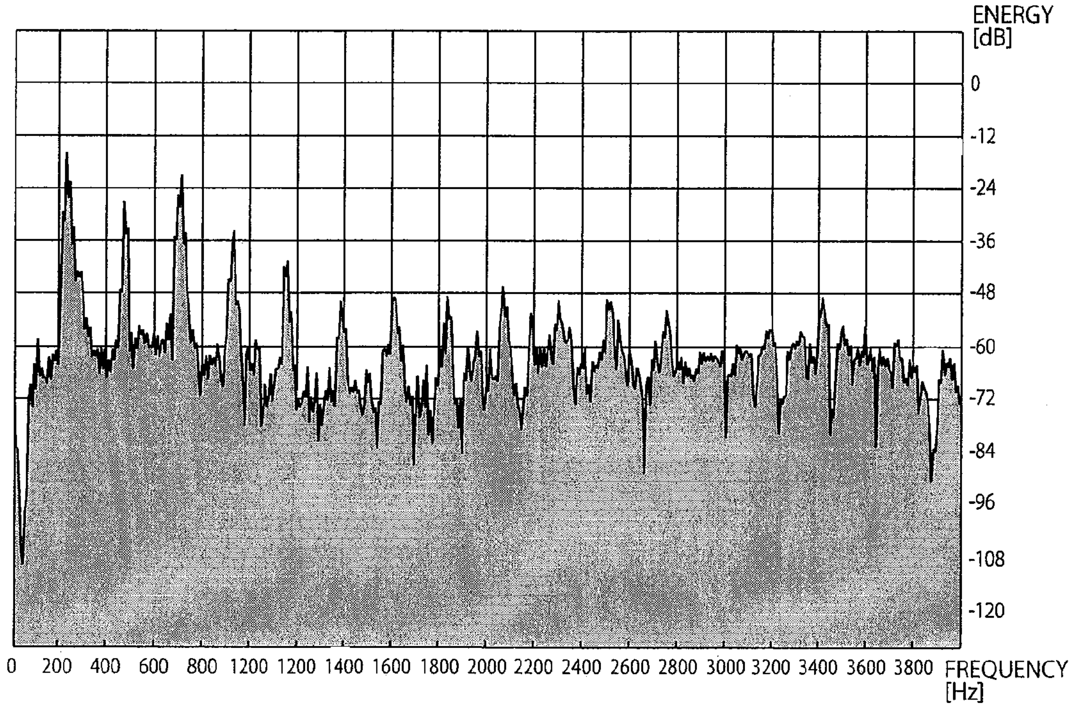
FIG. 3 is a view showing the frequency characteristics of the input signal of FIG. 2, with speech signal components only.

FIG. 2 is a view showing the frequency characteristics of an input signal involving periodic noise and speech signals. FIG. 3 is a view showing the frequency characteristics of the input signal of FIG. 2, with speech signal components only. As understood from the comparison between FIGS. 2 and 3, the input signal of FIG. 2 involves peak spectra 102 of a periodic noise signal and peak spectra 104 of a periodic speech signal. Both of the peak spectra 102 and 104 have a high energy level and hence it is difficult to distinguish between the peak spectra 102 and 104 by means of the energy level only. Moreover, although the peak spectra 102 and 104 of a noise and a speech signal, respectively, are both periodic, the peak spectra 102 and 104 are asynchronous with each other, hence exhibiting moderate peaks for autocorrelation in either or both of time and frequency domains, thus causing lower accuracy to speech detection with autocorrelation.

A battery-powered system, such as mobile communication equipment, requires less power consumption. Moreover, a digital ration communication system requires smaller delay, smaller processing load, less noise of a high energy level. However, if the cepstrum analysis is employed in these systems, it causes a heavier processing load and much power consumption, resulting in a higher cost, a bulkier system, etc.

In order to solve such problems, the present invention provides a speech processing apparatus and a speech processing method capable of attenuating periodic noises.

Embodiments of a speech processing apparatus and a speech processing method according to the present invention will be described with reference to the attached drawings.

(Speech Processing Apparatus 110)

Figure 4:
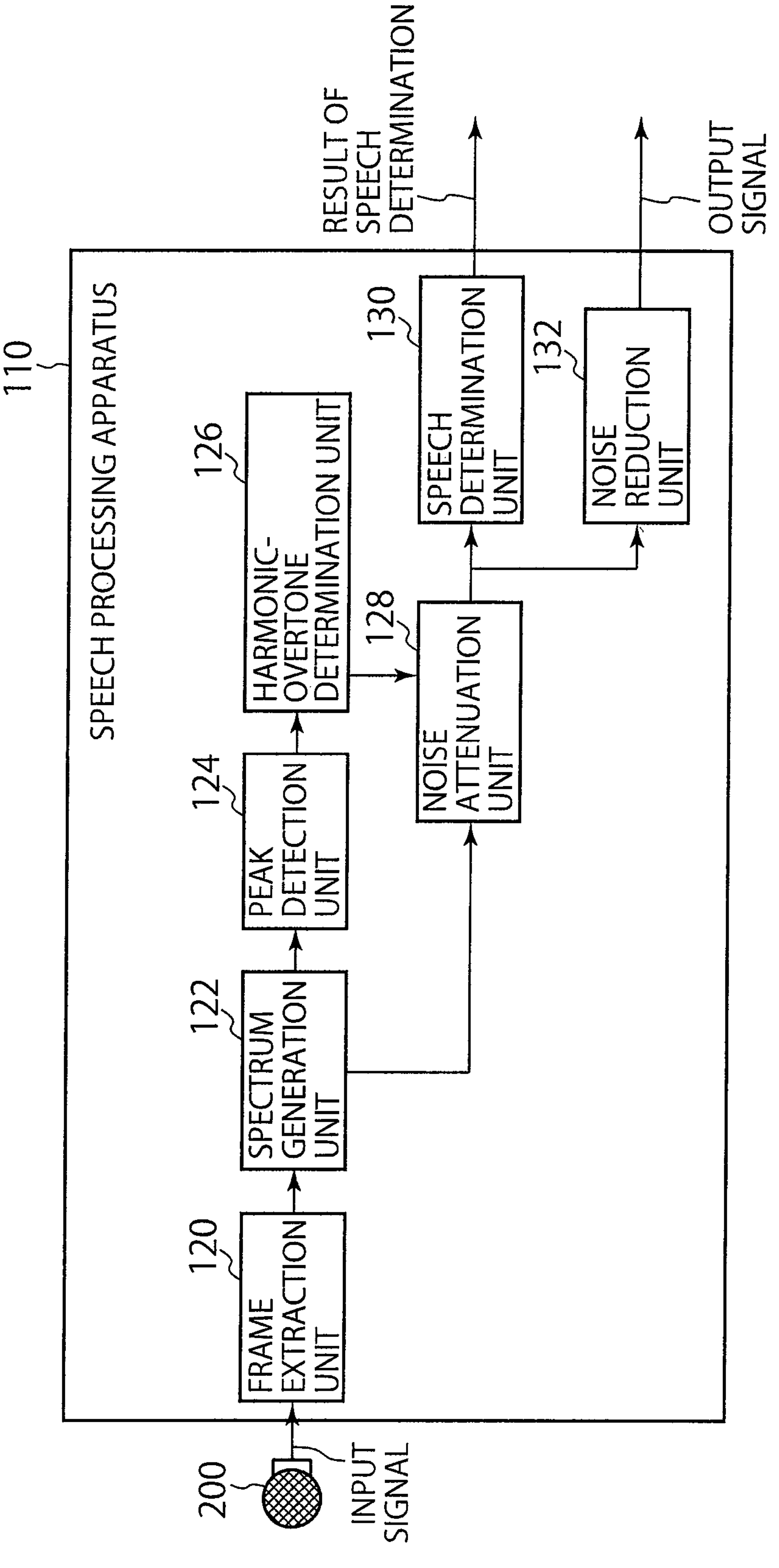
FIG. 4 is a view showing a functional block diagram for explaining a schematic configuration of a speech processing apparatus according to an embodiment of the present invention.

FIG. 4 is a view showing a functional block diagram for explaining a schematic configuration of a speech processing apparatus 110 according to an embodiment of the present invention.

The speech processing apparatus 110 is provided with a frame extraction unit 120, a spectrum generation unit 122, a peak detection unit 124, a harmonic-overtone determination unit 126, a noise attenuation unit 128, a speech determination unit 130, and a noise reduction unit 132.

In FIG. 4, a sound capture device 200 captures a voice and converts it into a digital signal. The digital signal is input to the frame extraction unit 120. The frame extraction unit 120 extracts a signal portion per frame having a specific duration corresponding to a specific number of samples from the input digital signal, to generate per-frame input signals. If the input signal to the frame extraction unit 120 from the sound capture device 200 is an analog signal, it can be converted into a digital signal by an A/D converter (not shown) provided before the frame extraction unit 120. The frame extraction unit 120 sends the generated per-frame input signals to the spectrum generation unit 122 one after another.

The spectrum generation unit 122 performs frequency analysis of the per-frame input signals to convert the per-frame input signals in the time domain into per-frame input signals in the frequency domain, thereby generating a spectral pattern. The spectral pattern is the collection of spectra having different frequencies over a specific frequency band. The technique of frequency conversion of per-frame signals in the time domain into the frequency domain is not limited to any particular one. Nevertheless, the frequency conversion requires high frequency resolution enough for recognizing voice spectra. Therefore, the technique of frequency conversion in this embodiment may be FFT (Fast Fourier Transform), DCT (Discrete Cosine Transform), etc. that exhibit relatively high frequency resolution.

In this embodiment, the spectrum generation unit 122 generates a spectral pattern in the range from at least 200 Hz to 2000 Hz.

In detail, in this embodiment, a frequency band to be observed is in the range from 200 Hz to 1000 Hz in which formants, the spectra exhibiting the feature of voices, are detected easier than other frequency bands. The upper limit for harmonic-overtone detection is 2000 Hz (=1000 Hz×2). The lower limit for harmonic-overtone detection is 200 Hz. The frequency below 200 Hz involves much noise, so that formants cannot be efficiently extracted from frequencies below 200 Hz. Nevertheless, in this embodiment, a frequency analysis includes the frequencies of about ±50 Hz of 200 Hz and of 2000 Hz. This is because the frequency analysis is performed for a frequency band with 200 Hz and 2000 Hz that are the border of the frequency to be analyzed and that are the lower and upper limits for efficiently extracting formants, respectively. The first formant (a fundamental pitch) of a voice spreads in the range roughly from 100 Hz to 500 Hz although there is a difference between men and women. In the low range of about 100 Hz, it could happen that speech signals cannot be detected mostly due to large noise energy portions in this range. For example, for a man of low voice, the first formant may be embedded in noises if it is about 100 Hz, and hence is difficult to detect. However, the second and third formants appear in a frequency band with comparatively small noises even for such a man of low voice, and hence are possible to detect. Accordingly, the peak detection unit 124 focuses on a frequency band from which formants are comparatively easily detected.

The peak detection unit 124 adds the energy of a plurality of spectra (the energy of three spectra in this embodiment) to derive the total of the energy of the spectra (referred to as total energy, hereinafter). In detail, the peak detection unit 124 derives the total energy for each spectrum group. A spectrum group and the next spectrum group in the frequency band discussed above include the same spectrum in the derivation of total energy, which will be described later.

Figure 5:
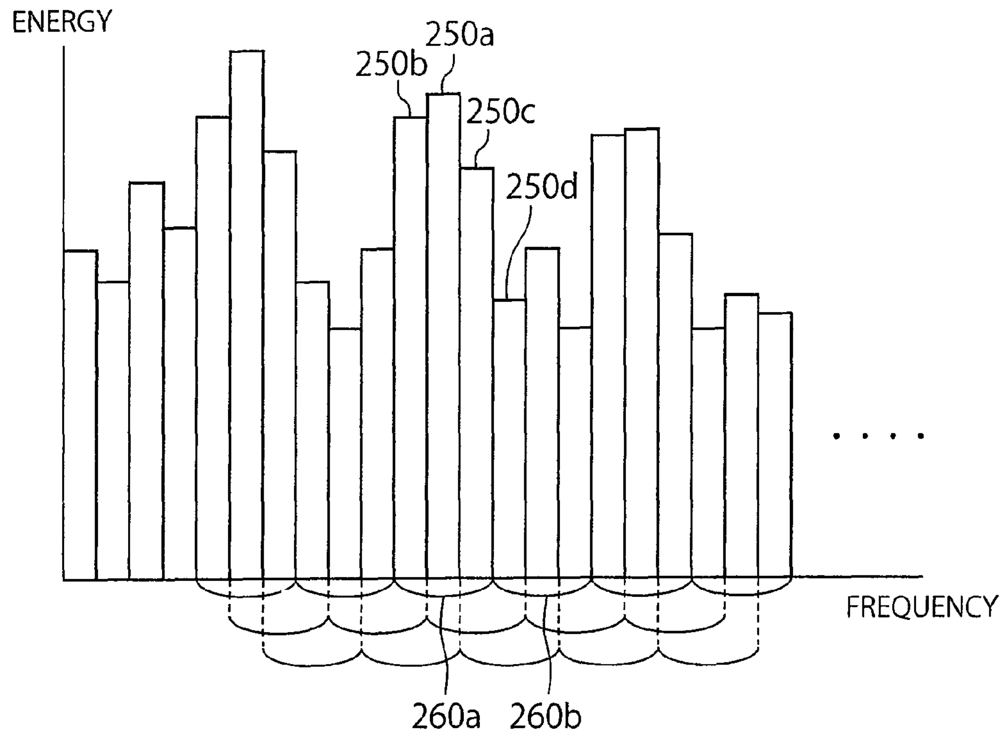
FIG. 5 is a view explaining the derivation of total energy, with a schematic illustration of the frequency characteristic of an input signal.

The function of the peak detection unit 124 will be described in detail with reference to FIG. 5 that is a view explaining the derivation of total energy, with a schematic illustration of the frequency characteristic of an input signal.

The peak detection unit 124 derives the total energy of a given spectrum 250*a* and neighboring spectra 250*b* and 250*c* appearing before and after the spectra 250*a* in the frequency band of a spectral pattern generated by the spectrum generation unit 122. Then, the peak detection unit 124 derives the total energy of the spectrum 250*c*, the neighboring spectrum 250*a* and a neighboring spectrum 250*d* appearing before and after the spectra 250*c*. In this way, the peak detection unit 124 shifts the focus on the barycentric spectrum interposed between the two neighboring spectra one by one to derive the total energy one by one over the frequency band of a spectral pattern generated by the spectrum generation unit 122.

After deriving the total energy over the frequency band of a spectral pattern, the peak detection unit 124 derives an energy ratio of the total energy of a plurality of spectra 260*a* subjected to speech determination and the total energy of a plurality of spectra 260*b* next to the spectra 260*a*.

The peak detection unit 124 derives the total energy by shifting the focus on the spectrum one by one with the same spectrum being used two times in the derivation of total energy for successive two spectrum group (each group having three spectra in the embodiment). On the other hand, the peak detection unit 124 derives the energy ratio for successive two spectrum groups (the spectra 260*a* and the spectra 260*b* in FIG. 5) without the same spectrum being included in the two groups.

After deriving the energy ratio, the peak detection unit 124 compares the derived energy ratio and a predetermined threshold level to determine the spectra 260*a* as a peak pattern if the energy ratio is equal to or higher than the threshold level. And then, the peak detection unit 124 detects at least one spectrum (for example, the spectrum 250*a*) among the spectra 260*a* as a peak spectrum in accordance with a predetermined criterion.

The predetermined threshold level may be 2 or 4 in order to detect spectra having the energy of 6 dB or 12 dB, respectively, higher than a noise component. This is because major spectra (from the first to fourth or fifth formant) of voices instantaneously (corresponding to one frame) posses the energy in the range from several dB to about 10 dB even if there is relatively much noise.

An equation (1) below is a general dB conversion formula.

$$\text{Ratio\_E} = 20 \times \log\left(\frac{\text{E\_peak}}{\text{E\_neighbor}}\right) \tag{1}$$

where Ratio_E, E_peak, and E_neighbor are: an energy ratio (dB); target total energy of a plurality of target spectra subjected to peak spectra detection; and total energy next to the target energy, respectively.

In accordance with the equation (1), the peak detection unit 124 compares an energy ratio (of the target total energy to the total energy of a plurality of spectra next to the target spectra) and the predetermined threshold level. When the energy ratio is equal to or higher than the predetermined threshold level, the peak detection unit 124 determines the target spectra that exhibit an energy ratio equal to or higher than the threshold level as a peak pattern. And then, the peak detection unit 124 detects at least one spectrum of the peak pattern as a peak spectrum in accordance with a predetermined criterion. The number of spectra subjected to the peak spectrum detection may be one or more of spectra.

The predetermined criterion may be the following criterion A or B.

The criterion A: If there are an odd number of spectra, determined as a peak spectrum is a specific spectrum having the center frequency in the spectra or a spectrum next to the specific spectrum.

The criterion B: If there are an even number of spectra, determined as a peak spectrum is either or both of two specific spectra having the frequency closest to the center frequency in the spectra or spectra next to the two spectra.

Among a plurality of spectra (for example, the spectra 260*a*), all spectra (for example, the spectra 250*a*, 250*b*, and 250*c*) may be detected as one peak spectrum.

Voices are produced by the vibration of the vocal cords, having a tremor component, with a peak having a certain bandwidth, hence there are energy components of the voices in a spectrum with a peak at the center frequency and in the neighboring spectra. Therefore, it is highly likely that that there are also energy components of the voices in spectra before and after the neighboring spectra. On the other hand, periodic noises, such as the sound of a siren, an engine, and the instantaneous sound of a blow, do not have a tremor component, even though the periodic noises have harmonic overtones. There may be no difference in energy in one spectrum between those periodic noises with no tremor components and a speech signal. However, when the energy of a spectrum next to the one spectrum is added to the energy of the one spectrum of periodic noises, the periodic noises have an energy component comparatively smaller than that of a speech signal for which the addition of energy is performed in a similar manner. Accordingly, the peak detection unit 124 performs the comparison of total energy between neighboring spectra to distinguish voices from noises based on the existence of a tremor component, to accurately detect voices.

The frequency bandwidth that covers the spectra subjected to the peak spectrum detection is narrower than 100 Hz, in this embodiment. A wider frequency bandwidth covering all of the spectra causes lower frequency resolution and hence results in difficulty in the determination of harmonic overtones. Therefore, it is preferable to set a comparatively narrow frequency bandwidth for all of the spectra. However, a much narrow frequency bandwidth causes a higher cost. It is preferable that formants are detected for a fundamental pitch of about 200 Hz or higher in the determination of harmonic overtones, in this embodiment. For this reason, the frequency bandwidth covering all of the spectra is set to the bandwidth narrower than 100 Hz that is one-half of 200 Hz for efficiently detecting formants. The bandwidth 100 Hz corresponds to the bandwidth that covers all of spectra including neighboring spectra based on a recommended value of the frequency resolution which will be discussed later.

The peak spectra detected by the peak detection unit 124 is sent to the harmonic-overtone determination unit 126. The harmonic-overtone determination unit 126 determines a harmonic spectrum that has a harmonic structure showing the relationship between a fundamental pitch and harmonic overtones, among the peak spectra.

In general, a speech spectrum has a harmonic structure. Therefore, a peak spectrum with no harmonic structure can be determined as a noise component. The harmonic-overtone determination unit 126 determines whether a peak spectrum sent from the peak detection unit 124 is a harmonic spectrum to determine whether the peak spectrum is a speech signal or a noise component. Equipped with the harmonic-overtone determination unit 126, the speech processing apparatus 110 can accurately distinguish between a speech component and a noise component for an input signal even if the input signal carries periodic noises that is captured in an environment where there is relatively much periodic noise.

The harmonic-overtone determination unit 126 may determine a harmonic spectrum based on a frequency that is the barycentric of a peak spectrum. However, in this embodiment, the harmonic-overtone determination unit 126 determines a harmonic spectrum based on a barycentric frequency weighted by the energy of each of spectra including surrounding frequency bands of a peak spectrum. In detail, the harmonic-overtone determination unit 126 derives a correct representative frequency of a peak spectrum detected by the peak detection unit 124 to determine whether the peak spectrum has a harmonic structure (or it is a harmonic spectrum.) The harmonic-overtone determination unit 126 performs weighting at a ratio of energy in the frequency band that covers the spectra, using the spectra (Spectrum (N−j)~Spectrum (N+j)) in an equation (2)) for which the total energy has been derived by the peak detection unit 124, to derive a barycentric frequency and set this frequency to a representative frequency.

$$Freq(N) = \frac{\sum_{i=N-j}^{N+j} \mathrm{E\_r}(i) \times \mathrm{Spec\_freq}(i)}{2 \times j + 1} \quad (2)$$

where Freq(N) is a barycentric frequency in a frequency band with Spectrum (N) being the barycentric, E_r(i) is a ratio of energy in (Spectrum (N−j)~Spectrum (N+j)), Spec_freq(i) is a representative frequency (center frequency) of Spectrum(i), N is the number indicating the location of a spectrum, and j is the number of spectra before and after Spectrum(N) in a frequency band in which Spectrum(N) is the center.

Figure 6:
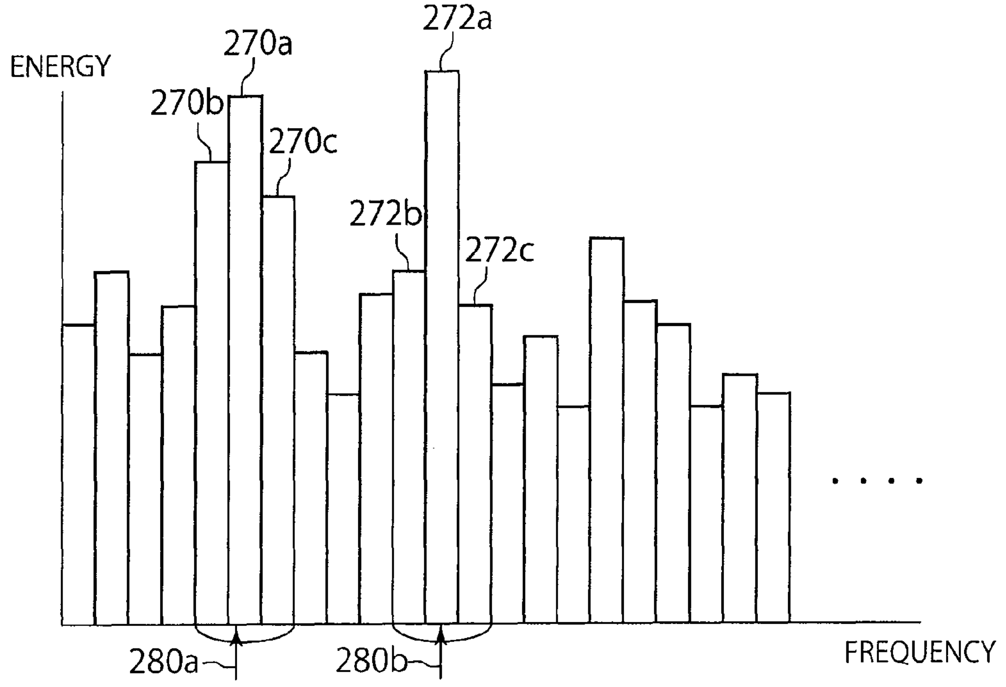
FIG. 6 is a view explaining a barycentric frequency with a schematic illustration of the frequency characteristics of an input signal.

FIG. 6 is a view explaining a barycentric frequency with a schematic illustration of the frequency characteristics of an input signal. In FIG. 6, it is supposed that spectra 270*a* to 270*c* are speech spectra corresponding to formants that are periodic and have a tremor component whereas spectra 272*a* to 272*c* are noise spectra that are periodic with no tremor components.

As shown in FIG. 6, the speech spectra 270*a* to 270*c* have a tremor component and hence the spectra 270*b* and 270*c* before and after the barycentric spectrum 270*a* with a high energy level have a comparatively high energy level. The harmonic-overtone determination unit 126 derives a barycentric frequency 280*a* based on the equation (2), even if it is difficult to detect the location of a real peak in a one peak spectrum. The barycentric frequency 280*a* allows accurate estimation of a frequency that is the top of a spectrum (referred to as a spectrum corresponding to a mountain, hereinafter) corresponding to the mountain of an envelope of a spectral pattern having the highest energy level, with a plurality of samples.

On the other hand, the noise spectra 272*a* to 272*c* have no tremor components and the barycentric spectrum 272*a* only has a comparatively high energy level while the spectra 272*b* and 272*c* before and after the barycentric spectrum 272*a* have a low energy level like the neighboring spectra. Therefore, even if a barycentric frequency 280*b* is derived based on the equation (2), it is almost equal to the frequency of the barycentric spectrum 272*a*, resulting in a large error from the location of a real peak of a derived frequency depending on frequency resolution. Therefore, the derivation of the barycentric frequency 280*b* and determination of a harmonic overtone result in that the noise spectra 272*a* to 272*c* having no tremor components are not fallen into the allowable error range for a harmonic structure. Accordingly, noise spectra are determined as having no harmonic relationship.

Next, the harmonic-overtone determination unit 126 extracts the derived barycentric frequencies one by one from a low frequency band, determines whether each extracted barycentric frequency has a harmonic relationship with all barycentric frequencies in a higher frequency band than each extracted barycentric frequency. Then, when there are barycentric frequencies that have a harmonic relationship with an extracted barycentric frequency and the number of these barycentric frequencies is equal to or larger than a first predetermined number, the harmonic-overtone determination unit 126 determines the peak spectrum (harmonic spectrum) from which the barycentric frequency has been extracted as a speech spectrum. On the other hand, the harmonic-overtone determination unit 126 determines a spectrum for which the number of barycentric frequencies having a harmonic relationship is smaller than the first predetermined number, as not a speech spectrum, that is, determines it as a noise spectrum.

In the determination process described above, the harmonic-overtone determination unit 126 treats the deviation of frequency about one-half of the frequency resolution as an allowable error range. With this allowable error range, the harmonic-overtone determination unit 126 reflects the effects of noise and/or tremor components on the determination process.

The harmonic-overtone determination unit 126 determines whether there is a harmonic structure by determining whether a spectrum is fallen into the allowable error range in a frequency that is a multiple of an extracted barycentric frequency in a low frequency band. Depending on whether there is a tremor component, the location of a peak is more accurately detected for a speech spectrum than a noise spectrum, as discussed above. Thus, a speech spectrum is easily determined as having a harmonic structure. Accordingly, there is a case where non-harmonic tones can be excluded by the harmonic determination.

The result of determination process in the harmonic-overtone determination unit 126 is sent to the noise attenuation unit 128.

The noise attenuation unit 128 attenuates the energy of a peak pattern from which harmonic spectra have been excluded. In other words, the noise attenuation unit 128 attenuates peak spectra determined as noises in the peak spectra. The noise attenuation unit 128 attenuates the energy of all of a plurality of (for example, three) spectra with the center peak spectrum determined as noises. In detail, it is preferable for the noise attenuation unit 128 to set the energy of a peak spectrum determined to be noises to the average energy of spectra that correspond to a valley of an envelope of spectral pattern (referred to as a spectrum corresponding to a valley, hereinafter) in a frequency band close to the frequency of the peak spectrum determined to be noises. The average energy discussed above can be determined as the energy of stationary noise. Too much attenuation of the energy of a peak spectrum determined to be noises causes a decrease in the sound quality. In order to avoid the decrease in the sound quality, the noise attenuation unit 128 sets the energy of a peak spectrum determined to be noises to the average energy of spectra, almost corresponding to the level of surrounding noises.

The energy-attenuated spectral pattern is sent from the noise attenuation unit 128 to the speech determination unit 130. The speech determination unit 130 determines whether the per-frame input signal is a speech segment based on the a spectral pattern for which the energy of a spectrum corresponding to a peak spectrum determined as noises has been attenuated among the peak spectra. The result of speech determination is output from the speech processing apparatus 110.

The speech determination process at the speech determination unit 130 after the attenuation of the energy of a peak spectrum determined as noises at the noise attenuation unit 128, as described above, enables accurate speech determination with less periodic noises. For example, the result of speech determination may be output from the speech processing apparatus 110 to an external encoding circuit (not shown). With the result of speech determination, the encoding circuit can, for example, switches a coding process for an input signal between a speech segment and a non-speech segment for higher compression ratio and transfer rate with good sound quality.

The energy-attenuated spectral pattern is also sent from the noise attenuation unit 128 to the noise reduction unit 132. The noise reduction unit 132 reduces a noise component in the peak pattern output from the noise attenuation unit 128 by, for example, spectrum subtraction, converts the noise-reduced spectral pattern into a signal in the time domain, and outputs the signal in the time domain as an output signal. The degree of noise reduction can be adjusted to the same level as the surrounding noises, as discussed above, for less degradation of sound quality with smaller quantization noise after frequency inversion.

The noise-reduction process at the noise reduction unit 132 after the attenuation of energy of a peak spectrum determined as noises at the noise attenuation unit 128, as described above, enables accurate noise reduction with less effect of periodic noises.

The speech processing apparatus 110 equipped with the noise attenuation unit 128, the speech determination unit 130, and the noise reduction unit 132 can be installed in mobile communication equipment, such as a mobile phone and a transceiver, for clearer sounds.

As described above, the harmonic-overtone determination unit 126 determines whether a peak spectrum is a harmonic spectrum to determine whether an input signal is a noise segment. Therefore, the speech processing apparatus 110 can accurately distinguish between a speech segment and a noise segment for an input signal even if the input signal is captured in an environment where there is relatively much periodic noises.

Moreover, the noise attenuation unit 128 can attenuate a periodic noise component. Therefore, the accuracy is enhanced for speech-segment determination in voice or speech recognition, for example. The periodic-noise attenuation function can be more effectively used when the speech processing apparatus 110 is equipped with a speech emphasis function, a noise reduction function, etc. Thus, when the speech processing apparatus 110 is used for mobile communication with extremely small delay only allowable or used in an environment of much noise, the apparatus 110 can provide clearer sounds. Therefore, it is possible to use the speech processing apparatus 110 in speech analysis, information transfer, etc.

(Speech Processing Method)

Described next is a speech processing method for the analysis of an input signal using the speech processing apparatus 110 described above.

Figure 7:
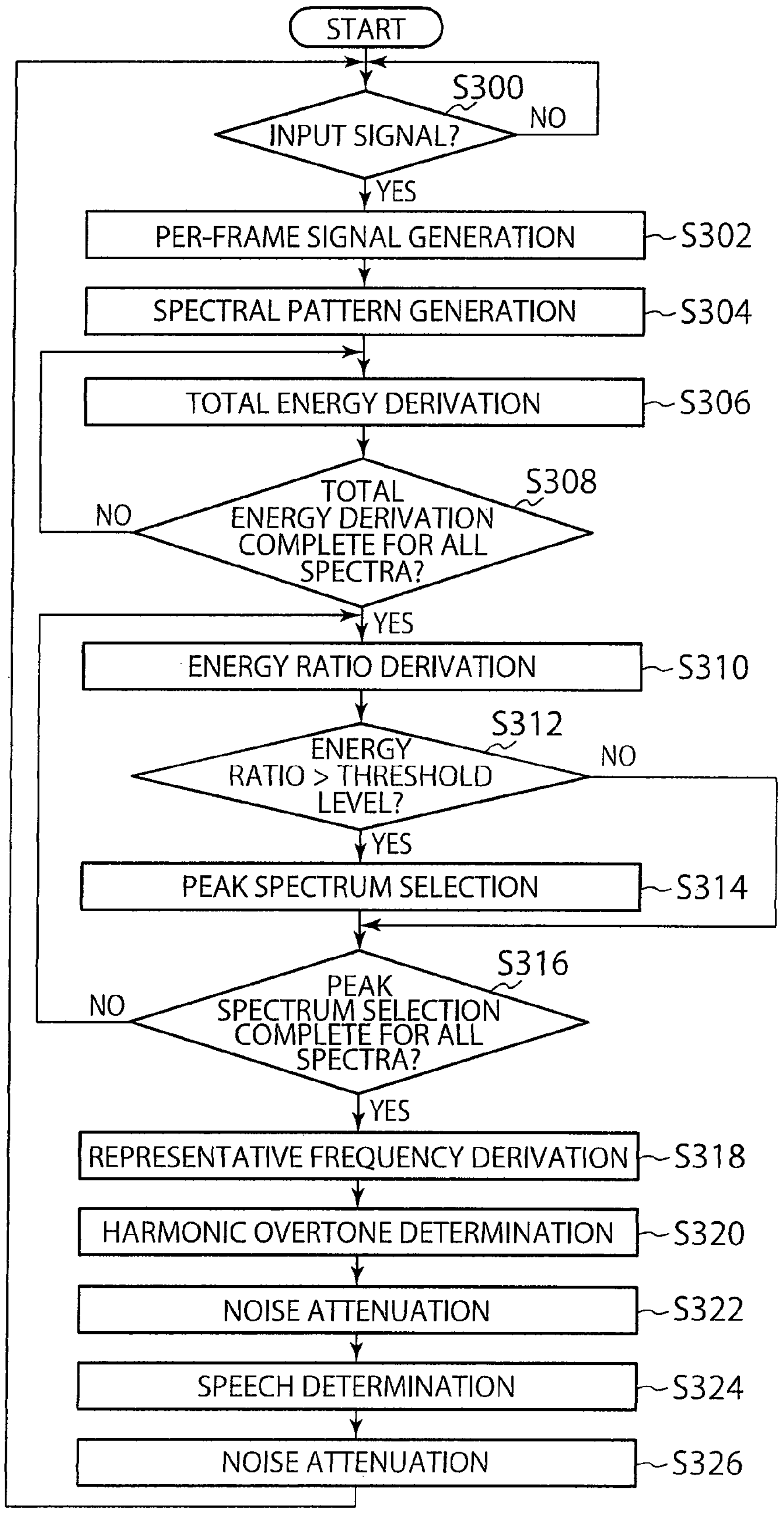
FIG. 7 is a view showing a flow chart indicating the entire flow of a speech processing method according to an embodiment of the present invention.

FIG. 7 is a view showing a flow chart indicating the entire flow of a speech processing method according to an embodiment of the present invention.

When there is an input signal (Yes in step S300), the frame extraction unit 120 extracts a signal portion per frame from an input digital signal acquired by the speech processing apparatus 100, thus generating per-frame input signals (step S302).

The spectrum generation unit 122 performs frequency analysis of the per-frame input signals to convert each per-frame input signal in the time domain into a per-frame input signal in the frequency domain, thereby generating a spectral pattern (step S304).

In step S304, the spectrum generation unit 122 generates a spectral pattern at frequency resolution below 33 Hz. In other words, recommended frequency resolution is below 33 Hz.

In detail, the detection of a formant at an energy ratio of a spectrum corresponding to a mountain to the neighboring a spectrum corresponding to a valley requires frequency resolution one-half of or narrower than the gap between standard formants of voices in the frequency domain. When the first formant is about 200 Hz mostly for standard voices of men, harmonic overtones appear at 400 Hz and 600 Hz. In order to detect these formants, it is preferable to observe the formants in a frequency band of about 100 Hz by which a mountain and a valley can be distinguished from each other.

For example, the peak detection unit 124 detects a peak spectrum with comparison of total energy between neighboring spectrum groups each having three spectra. In this case, for easier distinction between a voice having a harmonic structure together with a tremor component and a noise having a harmonic structure with no tremor components, there are preferable frequency bands that cover noise and speech components, respectively: a frequency band that covers a noise component corresponds to one spectrum (that is, frequency resolution); and a frequency band that covers a speech component corresponds to three spectra. A peak spectrum of a noise is mostly included in a narrow bandwidth. Thus, the treatment of a plurality of spectra as the energy of a speech spectrum, with frequency resolution below 33 Hz, relatively lowers the energy of a noise spectrum to accurately detect a speech spectrum.

Explained in detail is the case where the peak detection unit 124 detects a peak spectrum in a frequency band from 200 Hz to 400 Hz. In this case, the peak detection unit 124 can detect a peak spectrum of a voice by deriving an energy ratio for a frequency band from 250 Hz to 350 Hz of spectra corresponding to a valley, a frequency band from 150 Hz to 250 Hz of a spectrum corresponding to a mountain, and a frequency band from 350 Hz to 450 Hz of a spectrum corresponding to a mountain. The bandwidth that covers a plurality of spectra is preferably about 100 Hz.

Therefore, when the peak detection unit 124 detects a peak spectrum with comparison of total energy between neighboring spectrum groups each having three spectra, it is preferable to set the frequency resolution to the frequency of about 33 Hz or lower that is one-third of 100 Hz. The frequency resolution can be lowered (the bandwidth of a spectrum can be widened) if the frequency of the fundamental pitch of a formant to be detected is set to a higher frequency band than 200 Hz.

Following to step S304 in FIG. 7, the peak detection unit 124 adds the energy of a plurality of successive spectra of the spectral pattern to derive the total energy of the spectra (step S306). Then, the peak detection unit 124 determines whether the total energy has been derived for all spectra in the frequency range of the spectral pattern (S308). If not (No in step S308), the process returns to the total-energy derivation step S306. Accordingly, the peak detection unit 124 successively derives the total energy for the spectra by shifting the focus on the spectrum one by one with the same spectrum being used two times in the derivation of total energy for succeeding two spectrum groups (each group having three spectra, for example).

When the total-energy derivation is complete for all spectra (Yes in step S308), the peak detection unit 124 derives an energy ratio of the total energy of target spectra subjected to peak spectra detection and the total energy of spectra next to the target spectra (step S310).

Then, the peak detection unit 124 determines whether the derived energy ratio is higher than a predetermined threshold level (S312). If Yes in step S312, the peak detection unit 124 determines the target spectra as a peak pattern and detects one of the target spectra as a peak spectrum (S314). The predetermined threshold level is, for example, an energy ratio (Ratio_E) of 12 dB for spectra of a mountain and a valley, as described above. It is simply 4 when an energy ratio (E_peak/E_neighbor) is considered. As described with respect to FIG. 5, the energy ratio is derived for successive two spectrum groups without the same spectrum being included in the two groups.

Next, the peak detection unit 124 determines whether a peak spectrum has been selected for all spectra (S316). If not (No in step S316), the process returns to the energy-ratio derivation step S310.

When the peak-spectrum selection is complete for all spectra (Yes in step S316), the harmonic-overtone determination unit 126 derives a barycentric frequency for peak spectra selected by the peak detection unit 124 based on the equation (2) described above and sets the barycentric frequency to a representative frequency (S318).

Then, the harmonic-overtone determination unit 126 determines whether each peak spectrum is a harmonic spectrum, that is, it has a harmonic structure, based on the derived barycentric frequency (S320).

Two exemplary techniques for harmonic-overtone determination will be described below.

A first exemplary technique is to extract a predetermined number of peak spectra from all peak spectra in order of higher total energy in harmonic-overtone determination. There is a possibility that a peak spectrum derived as a representative frequency of 400 Hz or higher corresponds to a harmonic overtone. Therefore, the harmonic-overtone determination unit 126 determines whether there are other peak spectra with respect to a given peak spectrum in frequency bands that cover the frequencies that are one-third, one-half, double, triple, . . . , of the representative frequency of 400 Hz or higher. If there are a plurality of peak spectra (for example, three or more) that are determined as harmonic overtones with respect to a given peak spectrum, the harmonic-overtone determination unit 126 determines those peak spectra as speech spectra and excludes them from the harmonic-overtone determination.

Moreover, there is a possibility that a peak spectrum having a high energy level and for which the representative frequency is 600 Hz or higher corresponds to a third harmonic overtone (or a second or fourth harmonic overtone). Likewise, there is a possibility that a spectrum having a high energy level and for which the representative frequency is 800 Hz or higher corresponds to a fourth harmonic overtone (or a third or fifth harmonic overtone). Accordingly, the harmonic-overtone determination is performed with a larger integer for determining the existence of a peak spectrum having a representative frequency obtained by dividing a representative frequency of a peak spectrum by an integer, for peak spectra having a higher representative frequency in a peak pattern.

In the first exemplary technique, the harmonic-overtone determination is performed in order of higher total energy. Once, a peak spectrum is determined as having a harmonic structure in the current harmonic-overtone determination, this peak spectrum is excluded from the next harmonic-overtone determination. Therefore, the detection of speech spectra is almost complete if the harmonic-overtone determination is performed for about three peak spectra, described above.

A second exemplary technique is to extract a predetermined number of peak spectra from all peak spectra in order of lower representative frequency in the harmonic-overtone determination. In the first exemplary technique, the harmonic-overtone determination is performed for both of a low and a high frequency band if a representative frequency is located in an intermediate frequency band, for example, from about 300 Hz to 600 Hz, due to a possibility of the existence of harmonic spectra in low and high frequency bands with respect to a representative frequency in the intermediate frequency band. Different from the first exemplary technique, in the second exemplary technique, the harmonic-overtone determination unit 126 performs the harmonic-overtone determination for peak spectra of a low representative frequency in all peak spectra to determine the existence of a representative frequency corresponding to a harmonic overtone of the low representative frequency. Nevertheless, for higher accuracy, it is preferable for the harmonic-overtone determination unit 126 to perform the harmonic-overtone determination with extraction of a larger number of peak spectra than the predetermined number described in the first exemplary technique. This is because, although the energy of a formant is mostly at a low frequency band, it is not necessarily always the case that the energy of a formant is higher than the surrounding noises.

In the harmonic-overtone determination, the harmonic-overtone determination unit 126 determines a harmonic overtone with respect to a given peak spectrum if it is located in an allowable error frequency range that is one-half the frequency resolution at maximum.

Then, if the number of peak spectra corresponding to harmonic overtones with respect to a given peak spectrum, is smaller than a predetermined number, the harmonic-overtone determination unit 126 determines that the peak spectra are not harmonic spectra, or determines that the peak spectra are noises.

Following to step S320, the noise attenuation unit 128 attenuates the energy of peak spectra obtained by removing harmonic spectra from the peak pattern. In this way, the noise attenuation unit 128 attenuates peak spectra determined as noises in the peak spectra (S322).

Then, the speech determination unit 130 determines whether the per-frame input signal is a speech segment based on the spectral pattern for which the energy of a spectrum corresponding to a peak spectrum determined as noises has been attenuated, the result of speech determination being output (S324).

Then, the noise reduction unit 132 reduces a noise component in the peak pattern based on the spectral pattern for which the energy of a spectrum corresponding to the peak spectrum determined as noised has been attenuated and converts the noise-reduced spectral pattern into a signal in the time domain, and outputs the signal in the time domain as an output signal (S326).

According to the speech processing method described above in detail, noises are identified even if the noises are periodic, hence higher reliability and quality are achieved for a variety of types of speech processing systems in an environment with much noise.

It is further understood by those skilled in the art that the foregoing description is a preferred embodiment of the disclosed apparatus or method and that various changes and modifications may be made in the invention without departing from the sprit and scope thereof.

Moreover, the steps shown in the flow chart of FIG. 7 may not necessarily be performed in the order shown in FIG. 7 and additional steps may be included as parallel with the steps or in a subroutine.

As described above in detail, according to the present invention, the present invention provides a speech processing apparatus and a speech processing method for distinguishing between noise components and speech components even if noises are periodical like voices having periodicity.

What is claimed is:

1. A speech processing apparatus comprising:

a frame extraction unit configured to extract a signal portion per frame having a specific duration from an input signal that includes periodic non-speech segments, thus generating a per-frame input signal;

a spectrum generation unit configured to convert the per-frame input signal in a time domain into a per-frame input signal in a frequency domain, thereby generating a spectral pattern of spectra;

a peak detection unit configured to detect peak spectra having peaks in the spectral pattern by determining at least one spectrum of a first spectrum group of a predetermined number of spectra as the peak spectrum based on a predetermined criterion if an energy ratio of total energy of the first spectrum group to total energy of a second group of the predetermined number of spectra, next to the first spectrum group in the spectral pattern, is equal to or higher than a predetermined threshold level; and a harmonic-overtone determination unit configured to determine a harmonic spectrum, in the peak spectra, having a harmonic structure showing a relationship between a fundamental pitch and a harmonic overtone based on a barycentric frequency weighted by energy of each of the peak spectra; and a noise attenuation unit configured to attenuate energy corresponding to spectra obtained by removing the harmonic spectrum from the peak spectra in the spectral pattern.

2. The speech processing apparatus according to claim 1, wherein a frequency bandwidth that covers the first spectrum group is narrower than 100 Hz.

3. The speech processing apparatus according to claim 1, wherein the spectrum generation unit generates the spectral pattern at frequency resolution lower than 33 Hz.

4. The speech processing apparatus according to claim 1, wherein the spectrum generation unit generates the spectral pattern in a range from 200 Hz to 2000 Hz.

5. The speech processing apparatus according to claim 1 further comprising:

a speech determination unit configured to determine whether the per-frame input signal is a speech segment based on the energy-attenuated spectral pattern.

6. The speech processing apparatus according to claim 1 further comprising:

a noise reduction unit configured to reduce a noise component in the per-frame input signal.

7. The speech processing apparatus according to claim 1, wherein the predetermined criterion is that, if there are an odd number of spectra in the spectral pattern, determined as the peak spectrum is a specific spectrum having a barycentric frequency in the spectra in the spectral pattern or a spectrum next to the specific spectrum in the spectral pattern.

8. The speech processing apparatus according to claim 1, wherein the predetermined criterion is that if there are an even number of spectra in the spectral pattern, determined as the peak spectrum is either or both of two specific spectra having a frequency closest to the barycentric frequency in the spectra in the spectral pattern or spectra next to the two spectra in the spectral pattern.

* * * * *